Figure 3:
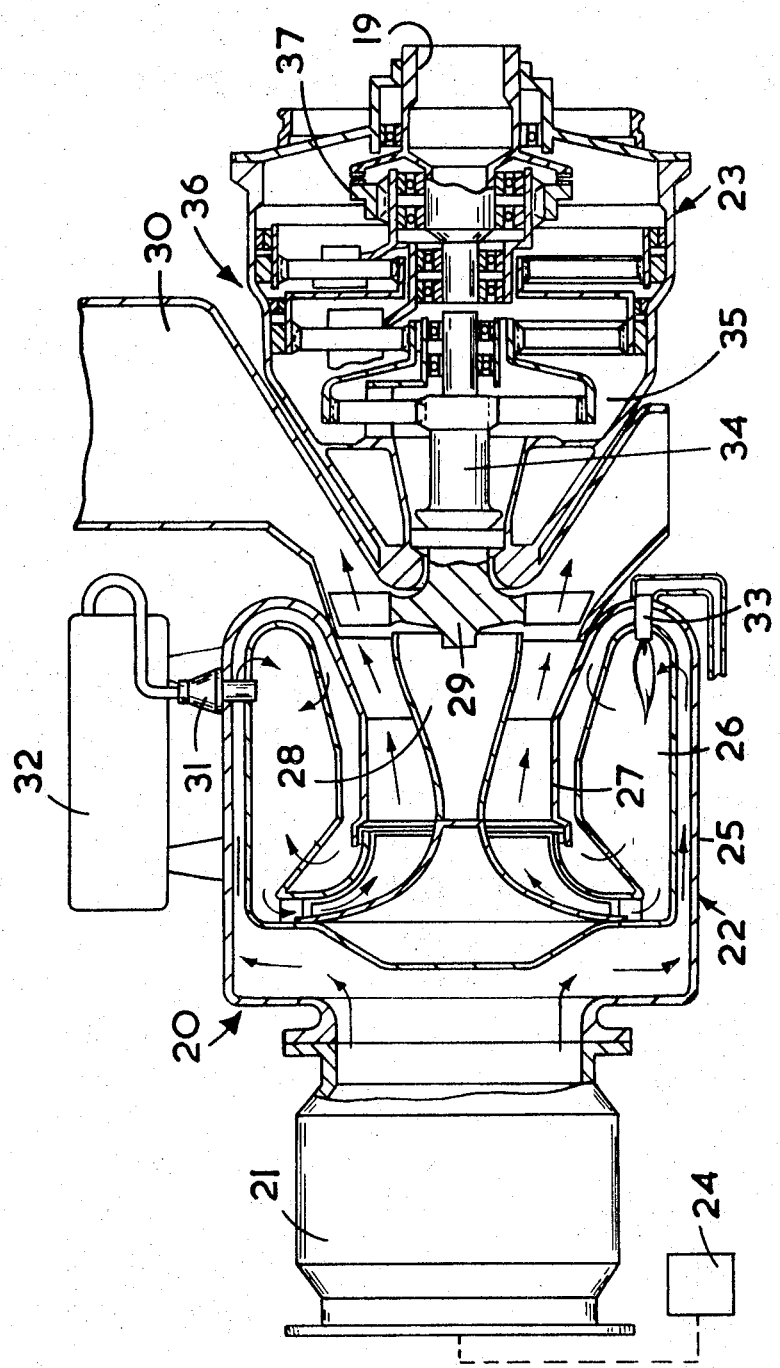

United States Patent [19]
Cross

[11] 3,764,094
[45] Oct. 9, 1973

[54] MOTOR POWERED WHEELS FOR AIRCRAFT

[75] Inventor: Ronald William Cross, Hemel Hempstead, England

[73] Assignee: Rotax Limited, Birmingham, England

[22] Filed: Dec. 7, 1971

[21] Appl. No.: 205,662

[30] Foreign Application Priority Data
Dec. 23, 1970 Great Britain................... 61,079/70

[52] U.S. Cl. ................................ 244/50, 180/66 R
[51] Int. Cl. .......................................... B64c 25/02
[58] Field of Search................ 244/50, 103 R, 103 S; 180/66 A, 66 F, 55, 66 R

[56] References Cited
UNITED STATES PATENTS
2,460,387  2/1949  Hunter................................ 244/50
2,540,991  2/1951  Price................................. 244/50 X FOREIGN PATENTS OR APPLICATIONS
527,139  5/1955  Italy................................. 180/66 A

*Primary Examiner*—Milton Buchler
*Assistant Examiner*—Paul E. Sauberer
*Attorney*—Holman & Stern

[57] ABSTRACT

A ground propulsion system for an aircraft includes a compressor driven by one of the main engines of the aircraft or an auxiliary engine, a turbine driven by the gaseous fluid supplied by the compressor and means including a gearbox coupling the turbine to a wheel of the aircraft.

6 Claims, 3 Drawing Figures

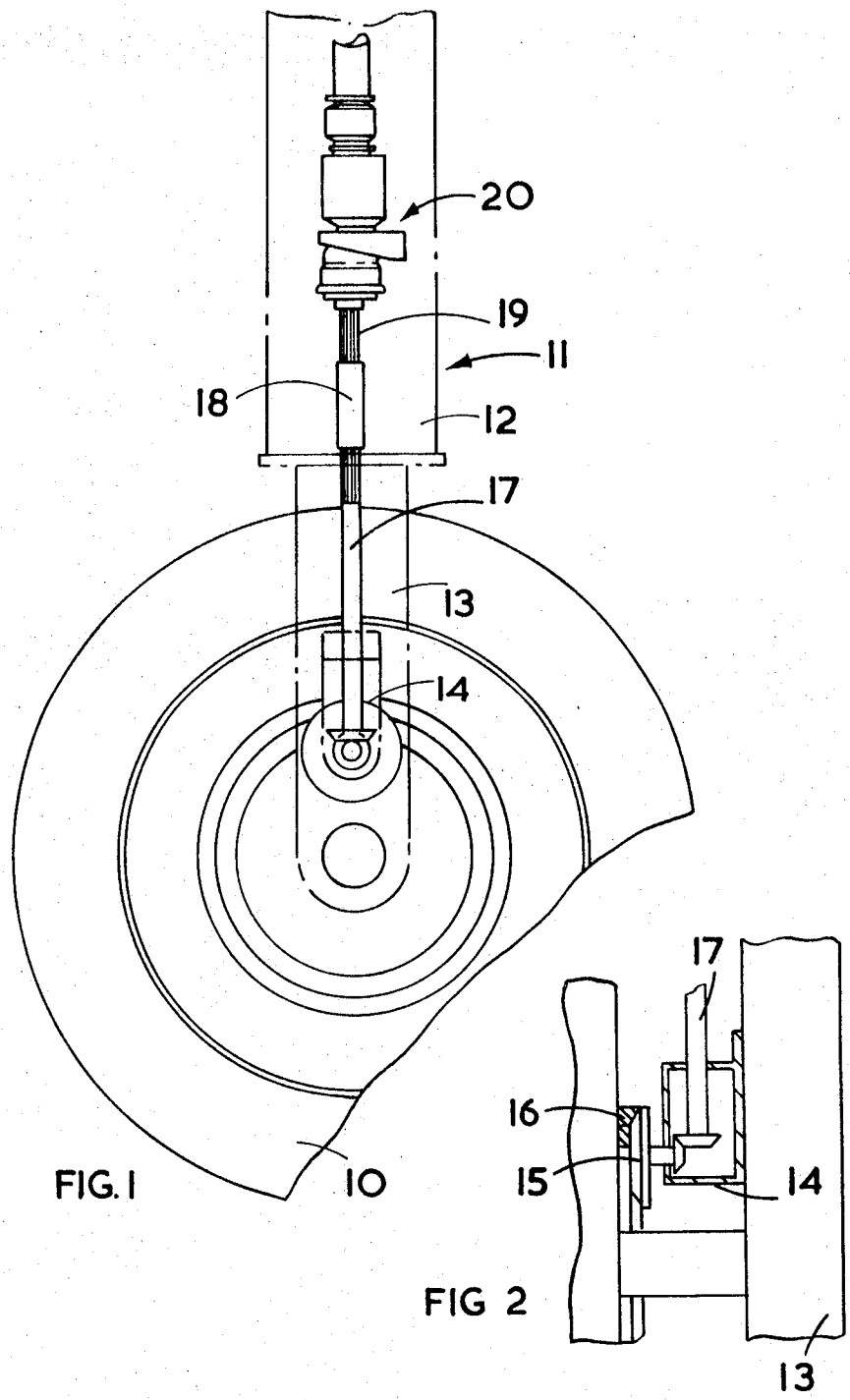

Patented Oct. 9, 1973

3,764,094

2 Sheets-Sheet 2

MOTOR POWERED WHEELS FOR AIRCRAFT

This invention relates to a ground propulsion system for an aircraft and has for its object to provide such a system in a simple and convenient form.

A system in accordance with the invention comprises a turbine operatively connected to a wheel of the aircraft to drive same and a compressor driven by or forming part of an engine carried by the aircraft for supplying motive fluid to the turbine.

In one example of a system in accordance with the invention there is provided a turbine which is operatively connected to a main wheel or a nose wheel of an aircraft. The turbine is supplied with motive fluid from a compressor. The compressor may be driven by a flight engine of the aircraft or an auxiliary engine carried by the aircraft. In the case where one of the flight engines is a gas turbine engine, it can be one of the compressors which forms part of the engine. A duct is provided to connect the compressor with the turbine and this includes a valve whereby the flow of motive fluid can be halted when it is no longer required.

In addition there is associated with the turbine, a combustion chamber through which the motive fluid in the form of air, can pass to the turbine and a fuel burner is disposed in the combustion chamber and which is supplied with fuel from the engine. In addition, a valve is provided to control the flow of fuel to the burner.

The arrangement is such that when it is required to move the aircraft on the ground the engine is started and air from the compressor is supplied to the turbine and this drives the wheel to effect movement of the aircraft. When the aircraft is rolling fuel is supplied to the combustion chamber and is burnt therein and by this means the turbine provides more power for moving the aircraft. This arrangement is adopted so as to avoid damage to the runway due to the hot gases leaving the turbine with the aircraft stationary or moving very slowly.

It is convenient for the turbine to be associated with the main wheel of the aircraft since in most large aircraft the nose wheel or wheels are steerable. For large aircraft more than one turbine burner system may be provided to provide the desired power.

The system described is particularly useful in that it enables the aircraft to be moved with only one of its flight engines or auxiliary power unit operating at low power. In this manner the amount of fuel required for taxiing purposes is greatly reduced.

If desired the turbine can be accommodated within the aircraft and the connection between the turbine and the wheel achieved by a flexible shaft. It will be appreciated that wherever the turbine is mounted some form of reduction gearing will be required intermediate the turbine and the wheel.

A specific example of a ground propulsion system in accordance with the invention will now be described with reference to the accompanying drawings in which:

FIG. 1 is a side view showing an aircraft wheel in side elevation together with the suspension strut and part of the system, FIG. 2 is an end elevation to an enlarged scale of part of the assembly shown in FIG. 1 and, FIG. 3 is a side elevation of another part of the assembly of FIG. 1.

With reference to FIGS. 1 and 2 of the drawings there is shown an aircraft wheel 10 and an oleo suspension unit 11. The wheel may be the nose wheel of the aircraft or one of the wheels forming the main undercarriage of the aircraft. The suspension unit includes a part 12 which is connected to the aircraft frame and a part 13 which is fixed to the wheel axle. Mounted on the part 13 is a bevel gearbox 14 having an output shaft upon which is mounted a bevel gear 15 which is in mesh with a bevel ring 16 which is secured to the rim of the wheel. The gearbox has an input shaft 17 having spline connection with a drive sleeve 18 and this in turn is in spline engagement with a drive shaft 19 extending from a power unit 20 mounted upon the part 12 of the suspension unit 11.

The power unit 20 is shown in greater detail in FIG. 3 and it comprises an air control valve 21, a combustion chamber turbine unit 22 and a reduction gearbox 23.

The air control valve 21 is of well known construction and provides on/off control of an air supply and also pressure regulation of the air downstream of the valve. The inlet of the valve is connected to an outlet of a compressor 24 forming part of one of the main gas turbine engines of the aircraft. Alternatively the compressor may be part of an auxiliary power unit of the aircraft.

The combustion chamber turbine unit 22 comprises an outer casing 25 within which is located an annular combustion chamber 26. The casing has a first inner annular wall 27 and a second inner annular wall which together define an annular passage for the flow of gaseous fluid leaving the combustion chamber. The aforesaid annular passage is connected at one end to the outlet of the combustion chamber 26 and at its other end it is shaped to direct fluid onto the blades of an axial flow turbine rotor 29. The casing 25 has an inlet for connection to the air control valve 21 and air can flow into the combustion chamber by way of a plurality of holes formed therein. An outlet 30 is provided for fluid leaving the turbine.

The combustion chamber is provided with an electrical igniter 31 which is supplied with power from a supply unit 32 and a plurality of fuel nozzles 33 are provided to direct fuel into the combustion chamber as required.

The reduction gearbox 23 includes an input shaft 34 upon which is mounted a pinion forming part of a first epicyclic speed reduction stage 35 of the gearbox. The planets of the first stage are mounted on bearings fixed to the casing of the gearbox and the annulus thereof is coupled to the input sun wheel of a second epicyclic speed reduction stage 36. This stage includes a pair of epicyclic units hereinafter referred to as units A and B. Unit A the sun wheel of which is coupled to the annulus of the first stage 35, has an angularly movable planet carrier which is coupled to the planet carrier of unit B. The annulus of Unit A is coupled to the sun wheel of unit B. Moreover, the annulus of Unit A can be locked by means of a band brake or allowed to rotate when the brake is released. Furthermore, a similar brake is provided for the annulus of unit B. The planet carriers of units A and B are coupled to the drive shaft 19 through a clutch 37 which can be disengaged if so required.

In use, when it is desired to drive the wheel the valve 21 is opened to admit air into the combustion chamber. The air leaving the combustion chamber drives the turbine and is exhausted through the outlet 30. The annulus of unit B is either free to rotate or is locked depending on the direction of drive required and the annulus of unit A is either free to rotate or is locked depending upon the speed reduction ratio required of the combined units A and B. The first stage 35 of the gearbox produces a speed reduction and an increase in the reduction is obtained whether the annulus of unit A is free or locked by its brake. The drive shaft 19 is driven through the clutch 37 from the connected planet carriers of units A and B, the appropriate speed reduction and direction being obtained by operation of the brakes on the annuli respectively it being understood that only one annulus can lock at any one time.

In the event that more power is required fuel can be supplied to the combustion chamber by way of the nozzle 33 and the fuel ignited by means of the igniter 31. This has the effect of increasing the temperature of the fluid supplied to the turbine.

When the aircraft is in a position for take off the clutch 37 can be disengaged by manual operation of the clutch. If desired however a control mechanism may be provided to automatically disengage the clutch once the safe maximum speed of the turbine rotor has been attained. Moreover, a governor mechanism may be provided in association with the fuel supply system and the valve 21 to provide governing of the speed at which the turbine rotor 29 rotates.

I claim:

1. A ground propulsion system for an aircraft having a wheel mounted upon one movable part of a wheel suspension unit, the other part of the suspension unit being connected to the aircraft, the wheel having a rim, a bevel gear ring carried by the rim of the wheel the system comprising a fluid operable turbine and a compressor driven by or forming part of an engine carried by the aircraft for supplying motive fluid to the turbine, a speed reduction gearbox having an input shaft coupled to the turbine and an output shaft, a bevel gear engaging the ring, said turbine and gearbox being mounted upon said other part of the suspension unit of the wheel, said bevel gear being mounted upon said one part of the suspension unit, and means coupling the bevel gear and the output shaft of the gearbox, said means being arranged to transmit drive between the output shaft of the gearbox and the bevel gear whilst allowing relative movement of the parts of the suspension unit.

2. A system according to claim 1 in which said means comprises a bevel gearbox having an input shaft and an output shaft, said output shaft mounting said bevel gear, said bevel gearbox being mounted upon said one part of the suspension unit, a sleeve having spline engagement with the input shaft of the bevel gearbox and also with the output shaft of the speed reduction gearbox.

3. A system according to claim 2 in which the fluid supplied by the compressor is air, the system including a combustion chamber in which fuel may be burnt to increase the temperature of the gaseous fluid supplied to the turbine.

4. A system as claimed in claim 3 including a fuel nozzle through which fuel can be admitted to the combustion chamber and an igniter for igniting the fuel.

5. A system as claimed in claim 4 including valve means for controlling the flow of air from the compressor.

6. A ground propulsion system for an aircraft having a wheel mounted upon one movable part of a wheel suspension unit, the other part of the suspension unit being connected to the aircraft, the wheel having a rim, the system comprising a fluid operable motor, a speed reduction gear box having an input shaft coupled to the motor and an output shaft, a bevel gear ring carried by the rim of the wheel, a bevelled gear engaging the ring, said turbine and gear box being mounted upon said other part of the suspension unit of the wheel, said bevel gear being mounted upon said one part of the suspension unit, and means coupling the bevel gear and the output shaft of the gearbox, said means being arranged to transmit drive between the output shaft of the gearbox and the bevel gear whilst allowing relative movement of the parts of the suspension unit.

* * * * *